(12) United States Patent
Xia et al.

(10) Patent No.: US 9,954,560 B2
(45) Date of Patent: Apr. 24, 2018

(54) ADAPTIVE/CONFIGURABLE INTERMEDIATE FREQUENCY (IF) WIRELESS RECEIVER AND BLUETOOTH DEVICE USING THE SAME

(71) Applicant: Wuxi Vimicro Corporation, Wuxi, Jiangsu (CN)

(72) Inventors: Bo Xia, Jiangsu (CN); Yue Wu, Jiangsu (CN); David Xiaodong Yang, Jiangsu (CN); Bin Xu, Jiangsu (CN); Li Kang, Jiangsu (CN)

(73) Assignee: Wuxi Vimicro Corporation, Jiangsu (CN)

( * ) Notice: Subject to any disclaimer, the term of this patent is extended or adjusted under 35 U.S.C. 154(b) by 0 days.

(21) Appl. No.: 14/519,643

(22) Filed: Oct. 21, 2014

(65) Prior Publication Data
US 2016/0013816 A1 Jan. 14, 2016

(30) Foreign Application Priority Data

Jul. 12, 2014 (CN) .......................... 2014 1 0330378
Aug. 15, 2014 (CN) .......................... 2014 1 0404519

(51) Int. Cl.
*H04B 1/00* (2006.01)
*H04B 1/18* (2006.01)
*H04L 7/033* (2006.01)

(52) U.S. Cl.
CPC ............ *H04B 1/0017* (2013.01); *H04B 1/18* (2013.01); *H04L 7/033* (2013.01); *H04W 4/80* (2018.02)

(58) Field of Classification Search
CPC ...... H04B 1/0007; H04B 17/18; H04B 17/19; H04B 2201/71346; H04B 1/26;
(Continued)

(56) References Cited

U.S. PATENT DOCUMENTS 5,564,099 A * 10/1996 Yonekura ................ H03D 7/161
375/327
6,744,828 B1 * 6/2004 Uchiyama ........... H04L 27/2657
375/326
(Continued)

*Primary Examiner* — Sophia Vlahos
(74) *Attorney, Agent, or Firm* — Joe Zheng

(57) ABSTRACT

Techniques pertaining to an adaptive/configurable IF wireless receiver are disclosed. Such an adaptive/configurable IF wireless receiver can be used in a Bluetooth device. According to one embodiment of the present invention, a wireless receiver is designed to include a low noise amplifier configured to amplify an input RF signal; an adjustable local RF synthesizer configured to provide a local RF clock signal with variable frequency; a RF mixer configured to down convert the amplified RF signal to an analog IF signal by mixing the local RF clock signal with the amplified RF signal; a filter configured to filter the analog IF signal; an analog to digital converter configured to convert the filtered analog IF signal to a digital IF signal; an adjustable digital local IF synthesizer configured to provide a digital local IF clock signal with variable frequency; a digital mixer configured to down convert the digital IF signal to a baseband signal by mixing the digital local IF clock signal with the digital IF signal; and an IF configuration unit provided to configure the adjustable local RF synthesizer to vary the frequency of the local RF clock signal, and configure the adjustable digital local IF synthesizer to vary the frequency of the digital local IF clock signal.

13 Claims, 2 Drawing Sheets

(58) Field of Classification Search
CPC ..... H04B 1/0017; H04B 1/18; H04L 27/2657; H04L 7/0025; H04L 7/033; H04W 4/008; H04W 4/80
See application file for complete search history.

(56) References Cited

U.S. PATENT DOCUMENTS

| | | | | |
|---|---|---|---|---|
| 6,970,717 | B2 * | 11/2005 | Behrens | H04B 1/0003 455/313 |
| 6,985,708 | B2 * | 1/2006 | Lin | H03L 7/0891 375/376 |
| 7,565,112 | B2 * | 7/2009 | Ragan | H04B 1/1027 455/141 |
| 7,733,986 | B2 * | 6/2010 | Fujii | H03L 7/193 375/327 |
| 8,160,529 | B1 * | 4/2012 | Clement | H03D 7/166 455/255 |
| 8,351,551 | B2 * | 1/2013 | Redfern | H04L 25/061 375/316 |
| 8,483,635 | B2 * | 7/2013 | Kawano | H04B 1/1081 455/136 |
| 8,744,021 | B1 * | 6/2014 | Gurney | H04B 1/1027 375/316 |
| 2015/0207654 | A1 * | 7/2015 | Prosperi | H04B 1/1036 375/340 |

* cited by examiner

ADAPTIVE/CONFIGURABLE INTERMEDIATE FREQUENCY (IF) WIRELESS RECEIVER AND BLUETOOTH DEVICE USING THE SAME

BACKGROUND OF THE INVENTION

1. Field of the Invention

The present invention relates to the area of wireless receiver, and in particular, to an adaptive/configurable IF wireless receiver and a Bluetooth device using the same.

2. Description of Related Art

Low intermediate frequency (IF) architecture is widely used in a narrow band wireless receiver design since it alleviates some impairments introduced by a DC (direct current) offset: an IM2 (second order inter-modulation) component and a flicker noise in a receiver system. However, to take full advantage of the benefit, many receivers select an IF to be at least 1.5 times of a channel bandwidth thereof. The cost to implement such a relatively high IF is the increase of the power consumption. Additionally, the IF is fixed in the commonly used low IF receiver. A receiver with fixed IF suffers performance degradation when there is a local RF frequency offset between a TX (transmitter) path and a RX (receiver) path. The fixed IF may also limit the employment of an advanced system level algorithm, such as the smart AFH (adaptive frequency hopping algorithm) and TX DC offset self calibration.

Therefore, improved techniques for the wireless receiver are desired to overcome the above and other related problems.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to an adaptive/configurable IF wireless receiver and a Bluetooth device using the same. According to one embodiment of the present invention, a wireless receiver is designed to include a low noise amplifier configured to amplify an input RF signal; an adjustable local radio frequency (RF) synthesizer configured to provide a local RF clock signal with variable frequency; a RF mixer configured to down convert the amplified RF signal to an analog IF signal by mixing the local RF clock signal with the amplified RF signal; a filter configured to filter the analog IF signal; an analog to digital converter configured to convert the filtered analog IF signal to a digital IF signal; an adjustable digital local IF synthesizer configured to provide a digital local IF clock signal with variable frequency; a digital mixer configured to down convert the digital IF signal to a baseband signal by mixing the digital local IF clock signal with the digital IF signal; and an IF configuration unit to configure the adjustable local RF synthesizer to vary the frequency of the local RF clock signal, and configure the adjustable digital local IF synthesizer to vary the frequency of the digital local IF clock signal.

According to another embodiment, a Bluetooth device is designed to include: a RF transmitter; a wireless receiver, comprising: a low noise amplifier configured to amplify an input RF signal; an adjustable local RF synthesizer configured to provide a local RF clock signal with variable frequency; a RF mixer configured to down convert the amplified RF signal to an analog IF signal by mixing the local RF clock signal with the amplified RF signal; a filter configured to filter the analog IF signal; an analog to digital converter configured to convert the filtered analog IF signal to a digital IF signal; an adjustable digital local IF synthesizer configured to provide a digital local IF clock signal with variable frequency; a digital mixer configured to down convert the digital IF signal to a baseband signal by mixing the digital local IF clock signal with the digital IF signal; and an IF configuration unit being able to configure the adjustable local RF synthesizer to vary the frequency of the local RF clock signal, and configure the adjustable digital local IF synthesizer to vary the frequency of the digital local IF clock signal.

There are many objects, features, and advantages in the present invention, these will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
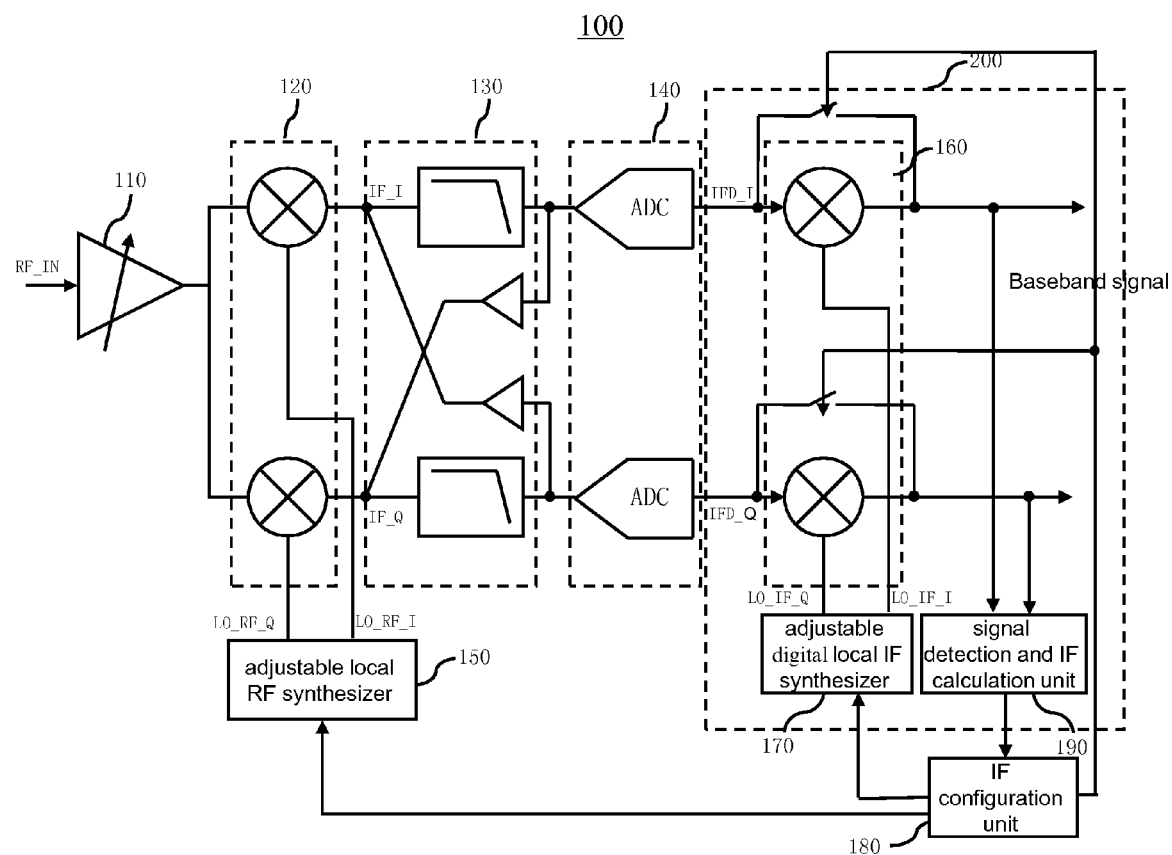
FIG. 1 is a block diagram showing a wireless receiver according to one embodiment of the present invention.

FIG. 1 is a block diagram showing a wireless receiver according to one embodiment of the present invention. The wireless receiver 100 has a configurable or adaptive IF signal. The wireless receiver 100 comprises a low noise amplifier (LNA) 110, a RF mixer 120, a filter 130, an analog to digital converter (ADC) 140, an adjustable local RF (Radio Frequency) synthesizer 150, a digital mixer 160, an adjustable digital local IF synthesizer 170 and an IF configuration unit 180.

In one embodiment, the LNA 110 is configured to amplify an input RF signal received from an antenna (not shown). The adjustable local RF synthesizer 150 is configured to provide a local RF clock signal with a variable frequency. The RF mixer 120 is configured to perform a quadrature down conversion to generate an analog IF signal by mixing the local RF clock signal with the amplified RF signal. The filter 130 is a low pass filter, a band pass filter or other types of filters to filter the analog IF signal outputted from the RF mixer 120. The ADC 140 is configured to convert the filtered analog IF signal to a digital IF signal. The adjustable digital local IF synthesizer 170 is configured to provide a digital local IF clock signal with the variable frequency. The digital mixer 160 is configured to perform a quadrature down conversion to generate a baseband signal by mixing the digital local IF clock signal with the digital IF signal. The IF configuration unit 180 is provided to configure the adjustable local RF synthesizer 150 to vary the frequency of the local RF clock signal, and cause the adjustable digital local IF synthesizer 170 to vary the frequency of the digital local IF clock signal.

A frequency of the analog IF signal generated by the RF mixer 120 is equal to a frequency of the input RF signal RF_IN minus a frequency of the local RF clock signal. The frequency of the analog IF signal generated by the RF mixer 120 changes when the frequency of the local RF clock signal changes. Thus, the frequency of the IF signal can be changed by varying the frequency of the local RF clock signal. As well known that the baseband signal is a zero frequency signal, in order to ensure the digital mixer 160 to obtain the normal baseband signal, the frequency of the digital local IF clock signal needs to be varied synchronously when the frequency of the IF signal is varied. Both the adjustable local RF synthesizer 150 and the adjustable digital local IF synthesizer 170 have frequency configuration parameters. The IF configuration unit 180 adjusts the frequency of the local RF clock signal outputted from the adjustable local RF synthesizer 150 by changing the frequency configuration parameter of the adjustable local RF synthesizer 150, and adjusts the frequency of the digital local IF clock signal outputted from the adjustable digital local IF synthesizer 170 by changing the frequency configuration parameter of the adjustable digital local IF synthesizer 170.

In one embodiment, the local RF clock signal comprises an In-phase (I) local RF clock signal LO_RF_I and a quadrature (Q) local RF clock signal LO_RF_Q, wherein the signals LO_RF_I and LO_RF_Q have the same frequency but 90 degree phase difference. The signals LO_RF_I and LO_RF_Q are changed synchronously when the local RF clock signal is changed by the adjustable local RF synthesizer 150. The digital local IF clock signal comprises an I digital IF clock signal LO_IF_I and a Q digital local IF clock signal LO_IF_Q, wherein the signals LO_IF_I and LO_IF_Q have the same frequency but 90 degree phase difference. The signals LO_IF_I and LO_IF_Q are changed synchronously when the digital local IF clock signal is changed by the adjustable digital local IF synthesizer 170.

The RF mixer 120 comprises a first mixer unit and a second mixer unit. The first mixer unit is configured to mix the I local RF clock signal LO_RF_I provided by the RF synthesizer 150 with the amplified RF signal outputted by the LNA 110 to generate an I component IF_I of the analog IF signal. The second mixer unit is configured to mix the Q local RF clock signal LO_RF_Q provided by the RF synthesizer 150 with the amplified RF signal outputted by the LNA 110 to generate a Q component IF_Q of the analog IF signal. The filter 130 comprises a first complex low pass or band pass filter unit and a second complex low pass or band pass filter unit. The first complex low pass or band pass filter unit is configured to filter the I component IF_I of the analog IF signal. The second complex low pass or band pass filter unit is configured to filter the Q component IF_Q of the analog IF signal. The ADC 140 comprises a first ADC unit and a second ADC unit. The first ADC unit is configured to convert the filtered I component IF_I of the analog IF signal to a digital I component IFD_I of the digital IF signal. The second ADC unit is configured to convert the filtered Q component IF_I of the analog IF signal to a digital Q component IFD_I of the digital IF signal. The digital mixer 160 comprises a first digital mixer unit and a second digital mixer unit. The first digital mixer is configured to mix the I digital IF clock signal LO_IF_I provided by the IF synthesizer 170 with the digital I component IFD_I to generate an I component of the baseband signal. The second digital mixer is configured to mix the Q digital IF clock signal LO_IF_Q provided by the IF synthesizer 170 with the digital Q component IFD_Q to generate a Q component of the baseband signal.

One of the objects, features, and advantages of the present invention is that the frequency of the IF signal is variable, and not fixed since the frequency of the local RF clock signal LO_RF_I and LO_RF_Q and the frequency of the digital local IF clock signal LO_IF_I and LO_IF_Q are variable. Thus, the wireless receiver has higher flexibility, and is able to optimize some performances thereof based on the variable IF signal.

The adaptive wireless receiver in one embodiment of the present invention employs two down conversion stages. The first down conversion is done by the RF mixer 120 in an analog domain. It converts the RF signal to the IF signal. The second down conversion is done by the digital mixer 160 in a digital domain 200. It converts the IF signal to the baseband signal.

The wireless receiver provided in the one embodiment comprises a normal signal receiving mode, a TX DC offset self calibration mode, and a fast channel scan mode, which will be described hereafter one by one.

Normal Signal Receiving Mode

Some low frequency components such a DC offset, an IM2 component and/or a flicker noise in the wireless receiver are difficult to estimate accurately in design because they change along with parameters such as actual circuit matching, process, temperature etc. In order to alleviate the impairment introduced by the DC offset, the IM2 and the flicker noise in the receiver system, the IF signal is set to be higher. However, the cost to implement such a relatively high IF signal is the increase of the power consumption. In the normal signal receiving mode of the present invention, the DC offset, the IM2 component and/or the flicker noise in the baseband signal are measured, the IF signal is varied adaptively based on the measured result. As a result, the minimum IF signal is used in the wireless receiver to minimize the power consumption on the premise that the measured values of the DC offset, the IM2 and the flicker noise satisfies a design requirement for correct demodulation.

The wireless receiver further comprises a signal detection and IF calculation unit 190. In the normal signal receiving mode, the signal detection and IF calculation unit 190 is configured for measuring the DC offset, the IM2 component and/or the flicker noise in the baseband signal, and determining or adjusting a nominal frequency of the IF signal adaptively based on the measured values of the DC offset, the IM2 component and/or the flicker noise until the minimum nominal frequency of the IF signal that can satisfy the design requirements of the DC offset, the IM2 component and the flicker noise are obtained. Based on the nominal frequency of the IF signal determined by the signal detection and IF calculation unit 190, the IF configuration unit 180 is provided to configure the adjustable local RF synthesizer 150 to vary the frequency of the local RF clock signal to ensure that the RF mixer 120 obtains the analog IF signal with the determined nominal frequency, and further configure the adjustable digital local IF synthesizer 170 simultaneously to vary the digital local IF clock signal to ensure that the digital mixer 160 obtains the normal baseband signal.

There are many methods to measure the DC offset, the IM2 component and/or the flicker noise in the baseband signal. For example, powers of the DC offset, the IM2 component and/or the flicker noise are obtained in an integration manner in a low frequency band. The selection of the integration band is determined by relevant provisions in corresponding wireless standards and implementation of the demodulator. It should be noted that all known measure methods of the DC offset, the IM2 component and/or the flicker noise in the baseband signal can be used in the present invention.

In one embodiment, the IF configuration unit 180 calculates a value of the frequency configuration parameter of the local RF synthesizer 150, and a value of the frequency configuration parameter of the local IF synthesizer 170 according to the nominal frequency of the IF signal determined by the signal detection and IF calculation unit 190. The IF configuration unit 180 is designed to configure the frequency configuration parameter of the local RF synthesizer 150 and the frequency configuration parameter of the local IF synthesizer 170 according to corresponding calculated values. As well known, the determined nominal frequency of the IF signal has a function relationship with the frequency configuration parameters of the local RF synthesizer 150 and the local IF synthesizer 170. The IF configuration unit 180 calculates the values of the frequency configuration parameters of the local RF synthesizer 150 and the local IF synthesizer 170 according to this function relationship. The function relationship may be different in different applications or designs.

In one embodiment, in the normal signal receiving mode, the signal detection and IF calculation unit 190 compares the measured values of the DC offset, the IM2 component and/or the flicker noise with corresponding thresholds, and decreases the nominal frequency of the IF signal in a predetermined step if all of the measure values are less than the corresponding thresholds. The IF configuration unit 180 is designed to configure the RF synthesizer 150 to ensure that the RF mixer 120 decreases the frequency of the analog IF signal, and further configure the IF synthesizer 170 to ensure that the digital mixer 160 obtains the normal baseband signal based on the adjusted nominal frequency of the IF signal. Forgoing operations is repeated until the minimum nominal frequency of the IF signal is obtained on the premise that all of the measure values of the DC offset, the IM2 component and/or the flicker noise are less than the corresponding thresholds.

The thresholds of the DC offset, the IM2 component and/or the flicker noise are determined by the performance requirements of the wireless receiver. In one embodiment, the thresholds of the DC offset, the IM2 component and/or the flicker noise are set to less than or equal to maximum values of the DC offset, the IM2 component and/or the flicker noise that can satisfy the performance requirements of the wireless receiver.

Another one of the objects, features, and advantages of the present invention is that the frequency of the IF signal is set to be the minimum by varying the frequency of the local RF clock signal and the frequency of the local IF clocking signal on the premise that the measured values of the DC offset, the IM2 and the flicker noise satisfies a design requirement. Thus, the minimum IF signal is used in the wireless receiver to decrease the power consumption on the condition that the performance of the wireless receiver satisfies the design requirement.

The local RF synthesizer 150 may be a phase locked loop (PLL) in analog domain. A relatively long settling time is required for the PLL to vary its output frequency. Hence, it is not suitable to vary the output frequency of the PLL frequently. In one embodiment, only when the wireless receiver is powered up or reset, the signal detection and IF calculation unit 190 determines or adjusts the nominal frequency of the IF signal adaptively based on the measured values, and then the IF configuration unit 180 configures the RF synthesizer 150 to vary the frequency of the local RF clock signal, and configures the IF synthesizer 170 to vary the frequency of the local IF clock signal. In other words, the frequency of the local RF clock signal only can be varied when the wireless receiver is powered up or reset, and cannot be varied once the wireless receiver has been powered up or reset.

As it is well known, the wireless receiver on a terminal device receives an RF signal transmitted by a wireless transmitter (not shown) on another terminal device. The wireless receiver has a RX path, and the wireless transmitter has a TX path. The wireless transmitter comprises a modulator and a TX local RF synthesizer generating a TX local RF clock signal. The modulator modulates the bandband signal into the RF output signal based on the TX local RF clock signal. Generally, there is a frequency offset between the RX local RF clock signal in the RX path and the TX local RF clock signal in the TX path, which changes the parameters such as channel, temperature, environment etc. and do harm the receiving performance of the wireless receiver.

In one embodiment, in the normal signal receiving mode, the signal detection and IF calculation unit 190 is configured for analyzing the baseband signal to obtain the frequency offset between the local RF clock signal in the TX path and the local RF clock signal in the RX path, and determining or adjusting the nominal frequency of the IF signal adaptively based on the frequency offset, and the IF configuration unit 180 configures the adjustable digital local IF synthesizer 170 to vary the frequency of the digital local IF clock signal to compensate the frequency offset. Thus, the frequency offset between the local RF clock signal in the TX path and the local RF clock signal in the RX path can be compensated effectively and timely by varying the frequency of the digital local IF clock signal in time. It should be noted that only the digital local IF clock signal needs to be modified, and the IF synthesizer 170 can be configured by the IF configuration unit 180. The change of the digital local IF clock signal can be in real time. Therefore, the tracking and compensation of the frequency offset can be implemented in a real time fashion.

In one embodiment, the wireless receiver is a narrow band communication system. The IF signal in the normal signal receiving mode can be considered to be in the ultra-low IF range. The IF signal is set to be 1 times of a channel bandwidth thereof. In other embodiment, the IF signal may not be in the ultra-low IF range.

Fast Channel Scan Mode

In a system supporting frequency hopping, such as Bluetooth device, the channel-to-be-used can be negotiated between master and slave devises. An adaptive frequency hopping (AFH) algorithm can be employed to avoid jammed channels and improve the anti-interference performance of the wireless receiver. The AFH algorithm performs the channel selection based on the knowledge of the in-band power distribution of the wireless receiver. The wireless receiver scans the whole band and acquires the in-band power distribution information in the fast channel scan mode. The receiving bandwidth in the normal signal receiving mode is much wider than in the fast channel scan mode in order to save power and avoid complicating the RX/TX timing arrangement. The selection of the bandwidth is a tradeoff among the power consumption, the timing planning and the accuracy of the in-band power distribution estimation. The IF signal of the receiver needs to be configured to a pre-determined frequency in the fast channel scan mode. The IF signal used in the fast channel scan mode is much higher than that used in the normal signal receiving mode.

In one embodiment, in the fast channel scan mode, the wireless receiver comes into a wideband receiving status, namely the receiving bandwidth of the wireless receiver becomes wider. In order to support the wider receiving bandwidth in the fast channel scan mode, the IF configuration unit 180 configures the adjustable local RF synthesizer 150 to vary the frequency of the local RF clock signal, and configures the adjustable digital local IF synthesizer 170 simultaneously to vary the frequency of the digital local IF clock signal.

TX DC Offset Self Calibration Mode

The wireless receiver works together with a wireless transmitter to form a complete RF transceiver in one terminal device, such as mobile phones with Bluetooth function. The DC offset or origin offset in the modulated TX signal can be harmful to the wireless communication system. It is desirable to cancel the DC offset. There is a TX DC offset self calibration mode in the RF transceiver according to one embodiment of the present invention. In this TX DC offset self calibration mode, the TX signal transmitted by the wireless transmitter is looped directly back to the wireless receiver. The DC offset in the TX signal is analyzed in the signal detection and IF calculation module 180, The analyzed result is fed back and compensated in the wireless transmitter. A common local RF clock signal is shared by the receiver and the transmitter in the TX DC offset self calibration. Since the transmitter adopts a direct up conversion architecture, the receiver needs to be configured as a 0-IF architecture.

In the TX DC offset self calibration mode, the RF mixer 120 down converts the RF signal directly to the baseband signal, and the digital IF down conversion stage is bypassed. In one embodiment, in the TX DC offset self calibration mode, the IF configuration unit 180 configures the adjustable local RF synthesizer 150 to provide the common local RF clock signal to ensure that the RF mixer 120 obtains the analog 0-IF signal, namely, the RF mixer 120 down converts the RF signal directly to the baseband signal. The IF configuration unit 180 further turns on a switch connected with the digital mixer 160 in parallel to bypass the digital mixer 160 so that the digital 0-IF signal from the ADC 140 is outputted as the baseband signal directly.

Figure 2:
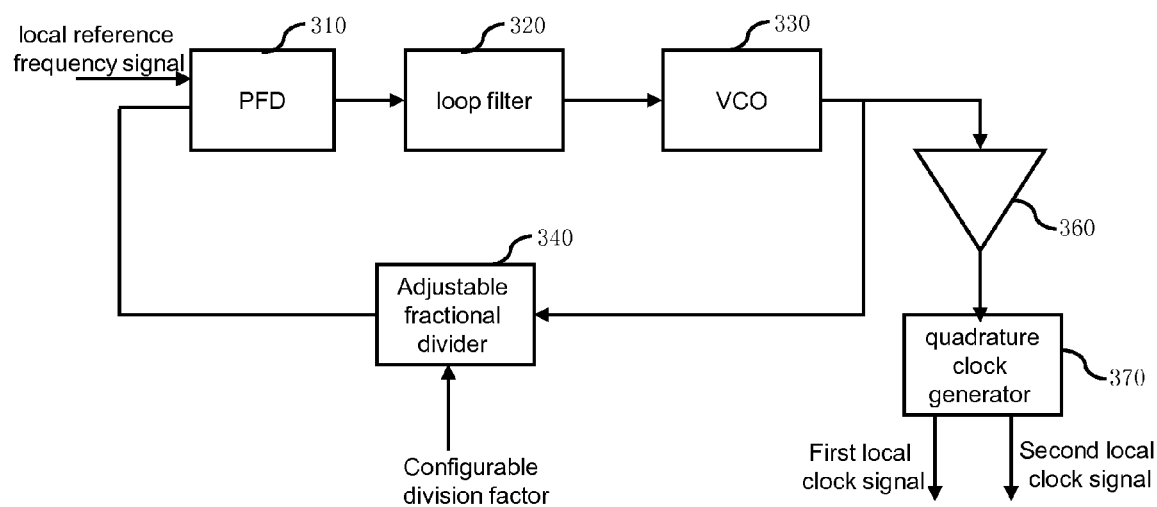
FIG. 2 is a block diagram showing an adjustable local RF synthesizer in the wireless receiver shown in FIG. 1 according to one embodiment the present invention.

FIG. 2 is a block diagram showing an adjustable local RF synthesizer in the wireless receiver shown in FIG. 1 according to one embodiment the present invention. The adjustable local RF synthesizer 150 of FIG. 1 comprises a phase frequency detector (PFD) 310, a loop filter 320, a voltage controlled oscillator (VCO) 330, an adjustable fractional divider 340, a buffer 360 and a quadrature clock generator 370.

The PFD 310 is designed to detect a phase difference between a local reference frequency signal and a divided clock signal generated by the fractional divider 340, and output an error voltage according to the phase difference. The loop filter 320 is configured to filter the error voltage to generate a control voltage. The voltage controlled oscillator 330 is configured to output a local clock signal according to the control voltage. The adjustable fractional divider 340 is configured to divide the local clock signal outputted from the VCO 330 based on a configurable division factor and output the divided clock signal to the PFD 310. The PFD 310, the loop filter 320, the VCO 330, the adjustable fractional divider forms a phase locked loop (PLL). The frequency and the phase of the local reference frequency signal are identical with that of the divided clock signal outputted from the divider 340 when the loop is locked. The buffer 360 is configured to buffer the local clock signal outputted from the VCO 330. The quadrature clock generator 370 is configured to generate a first local clock signal and a second local clock signal having the same frequency and 90 degree phase difference with the first local clock signal according to the local clock signal. The first local clock signal serves as the I local RF clock signal RF_I, and the second local clock signal serves as the Q local RF clock signal RF_Q. In one embodiment, the configurable division factor is regarded as the frequency configuration parameter of the adjustable local RF synthesizer 150. The IF configuration unit 180 configures the adjustable local RF synthesizer to vary the frequency of the local RF clock signal by varying the division factor of the adjustable local RF synthesizer 340.

As shown in FIG. 1, the adjustable digital local IF synthesizer 170 has a similar structure with the adjustable local RF synthesizer 150 except that the adjustable digital local IF synthesizer 170 is a digital synthesizer. However, the implementations of the synthesizers 150 and 170 are not inherently limited in the present invention.

According to another aspect of the present invention, the wireless receiver with variable IF signal can be used in a Bluetooth device to receive the RF signal. The wireless receiver with variable IF signal is especially suitable for a system having larger local RF frequency offset between the TX path and the RX path, such as the Bluetooth device because the wireless receiver is capable of compensating the local RF frequency offset adaptively.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A wireless receiver having a normal signal receiving mode, the wireless receiver comprising:
   a low noise amplifier amplifying an input RF signal;

an adjustable local radio frequency (RF) synthesizer providing a local RF clock signal with a variable frequency;
a RF mixer down-converting the amplified RF signal to an analog intermediate frequency (IF) signal by mixing the local RF clock signal with the amplified RF signal;
a filter filtering the analog IF signal;
an analog-to-digital converter (ADC) converting the filtered analog IF signal to a digital IF signal;
an adjustable digital local IF synthesizer providing a digital local IF clock signal with a variable frequency;
a digital mixer down-converting the digital IF signal to a baseband signal by mixing the digital local IF clock signal with the digital IF signal;
an IF configuration unit configuring the adjustable local RF synthesizer to vary the frequency of the local RF clock signal, and configuring the adjustable digital local IF synthesizer to vary the frequency of the digital local IF clock signal; and
a signal detection and IF calculation unit measuring a direct current (DC) offset, a second order inter-modulation (IM2) component and/or a flicker noise in the baseband signal, and determining or adjusting a nominal frequency of the analog IF signal adaptively based on measured values of the DC offset, the IM2 component and/or the flicker noise until a minimum nominal frequency of the analog IF signal is obtained such that measured values of the DC offset, the IM2 and the flicker noise satisfy a requirement for correct demodulation, wherein the IF configuration unit is caused to configure the adjustable local RF synthesizer and the adjustable digital local IF synthesizer based on the nominal frequency of the analog IF signal determined by the signal detection and IF calculation unit to ensure that the RF mixer obtains the analog IF signal with the nominal frequency and the digital mixer obtains the normal baseband signal of the normal signal receiving mode, wherein the signal detection and IF calculation unit performs operations of:
comparing the measured values of the DC offset, the IM2 component and/or the flicker noise with corresponding thresholds;
decreasing the nominal frequency of the analog IF signal in a predetermined step when all of the measured values are less than the corresponding thresholds; and
obtaining the minimum nominal frequency of the analog IF signal so that all of the measured values are less than the corresponding thresholds.

2. The wireless receiver according to claim 1, wherein when the wireless receiver is powered up or reset, the signal detection and IF calculation unit is caused to measure the DC offset, the IM2 component and/or the flicker noise in the baseband signal, and determine or adjust the nominal frequency of the analog IF signal adaptively based on the measured values of the DC offset, the IM2 component and/or the flicker noise.

3. The wireless receiver according to claim 1, wherein in the normal signal receiving mode, the signal detection and IF calculation unit is caused to analyze the baseband signal to obtain a frequency offset between a local RF clock signal in a TX path of a wireless transmitter and the local RF clock signal in a RX path of the wireless receiver, and determine or adjust the nominal frequency of the analog IF signal adaptively based on the frequency offset, and the IF configuration unit configures the adjustable digital local IF synthesizer to vary the frequency of the digital local IF clock signal to compensate the frequency offset.

4. The wireless receiver according to claim 1, wherein the wireless receiver has a TX DC offset self calibration mode, and the wireless receiver and a wireless transmitter on a same device form a RF transceiver, wherein
in the TX DC offset self calibration mode, the wireless receiver receives the RF signal transmitted by the wireless transmitter, the wireless receiver and the RF transmitter share a common local RF clock signal, and the IF configuration unit causes the adjustable local RF synthesizer to provide the common local RF clock signal to ensure that the RF mixer obtains the analog IF signal with 0 frequency and turns on a switch connected with the digital mixer in parallel to output the digital IF signal with 0 frequency from the analog to digital converter directly.

5. The wireless receiver according to claim 1, wherein the wireless receiver has a fast channel scan mode, and a receiving bandwidth of the wireless receiver in the fast channel scan mode is wider than that in the normal signal receiving mode, and wherein the IF configuration unit causes the adjustable local RF synthesizer and the adjustable digital local IF synthesizer to support the fast channel scan mode.

6. The wireless receiver according to claim 1, wherein the wireless receiver is a narrow band communication system, and the analog IF signal is an ultra low range.

7. The wireless receiver according to claim 1, wherein the adjustable local RF synthesizer comprises a phase frequency detector, a loop filter, a voltage controlled oscillator, an adjustable fractional divider, a buffer and a quadrature clock generator; and wherein
the phase frequency detector detects a phase difference between a local reference frequency signal and a signal generated by the fractional divider and outputs an error voltage according to the phase difference;
the loop filter filters the error voltage;
the voltage controlled oscillator outputs a local clock signal according to the filtered error voltage;
the fractional divider divides the clock signal outputted from the voltage controlled oscillator according to a division factor thereof;
the buffer buffers the local clock signal;
the quadrature clock generator generates a first local clock signal and a second local clock signal having the same frequency and 90 degree phase difference with the first local clock signal according to the local clock signal;
the IF configuration unit causes the adjustable local RF synthesizer to vary the frequency of the local RF clock signal by varying the division factor, and
the first local clock signal and the second local clock signal serve as the local RF clock signal.

8. A Bluetooth device having a normal signal receiving mode, the Bluetooth device comprising:
a RF transmitter;
a wireless receiver comprising:
a low noise amplifier amplifying an input RF signal;
an adjustable local radio frequency (RF) synthesizer providing a local RF clock signal with a variable frequency;
a RF mixer down-converting the amplified RF signal to an analog intermediate frequency (IF) signal by mixing the local RF clock signal with the amplified RF signal;
a filter filtering the analog IF signal;
an analog-to-digital converter (ADC) converting the filtered analog IF signal to a digital IF signal;

an adjustable digital local IF synthesizer providing a digital local IF clock signal with a variable frequency;

a digital mixer down-converting the digital IF signal to a baseband signal by mixing the digital local IF clock signal with the digital IF signal; and an IF configuration unit configuring the adjustable local RF synthesizer to vary the frequency of the local RF clock signal, and configuring the adjustable digital local IF synthesizer to vary the frequency of the digital local IF clock signal; and a signal detection and IF calculation unit measuring a direct current (DC) offset, a second order inter-modulation (IM2) component and/or a flicker noise in the baseband signal, and determining or adjusting a nominal frequency of the analog IF signal adaptively based on measured values of the DC offset, the IM2 component and/or the flicker noise until a minimum nominal frequency of the analog IF signal is obtained such that measured values of the DC offset, the IM2 and the flicker noise satisfy a requirement for correct demodulation, wherein the IF configuration unit is caused to configure the adjustable local RF synthesizer and the adjustable digital local IF synthesizer based on the nominal frequency of the analog IF signal determined by the signal detection and IF calculation unit to ensure that the RF mixer obtains the analog IF signal with the nominal frequency and the digital mixer obtains the normal baseband signal of the normal signal receiving mode, wherein the signal detection and IF calculation unit performs operations of:

comparing the measured values of the DC offset, the IM2 component and/or the flicker noise with corresponding thresholds;

decreasing the nominal frequency of the analog IF signal in a predetermined step when all of the measured values are less than the corresponding thresholds; and obtaining the minimum nominal frequency of the analog IF signal so that all of the measured values are less than the corresponding thresholds.

9. The Bluetooth device according to claim 8, wherein when the wireless receiver is powered up or reset, the signal detection and IF calculation unit is caused to measure the DC offset, the IM2 component and/or the flicker noise in the baseband signal, and determine or adjust the nominal frequency of the analog IF signal adaptively based on the measured values of the DC offset, the IM2 component and/or the flicker noise.

10. The Bluetooth device according to claim 8, wherein in the normal signal receiving mode, the signal detection and IF calculation unit is caused to analyze the baseband signal to obtain a frequency offset between a local RF clock signal in a TX path of a wireless transmitter and the local RF clock signal in a RX path of the wireless receiver, and determine or adjust the nominal frequency of the analog IF signal adaptively based on the frequency offset, and the IF configuration unit configures the adjustable digital local IF synthesizer to vary the frequency of the digital local IF clock signal to compensate the frequency offset.

11. The Bluetooth device according to claim 8, wherein the wireless receiver has a TX DC offset self calibration mode, and the wireless receiver and a wireless transmitter on the same device form a RF transceiver, and wherein in the TX DC offset self calibration mode, the wireless receiver receives the RF signal transmitted by the wireless transmitter, the wireless receiver and the RF transmitter share a common local RF clock signal, and the IF configuration unit causes the adjustable local RF synthesizer to provide the common local RF clock signal to ensure that the RF mixer obtains the analog IF signal with 0 frequency and turns on a switch connected with the digital mixer in parallel to output the digital IF signal with 0 frequency from the analog to digital converter directly.

12. The Bluetooth device according to claim 8, wherein the wireless receiver has a fast channel scan mode, and a receiving bandwidth of the wireless receiver in the fast channel scan mode is wider than that in the normal signal receiving mode, and wherein the IF configuration unit causes the adjustable local RF synthesizer and the adjustable digital local IF synthesizer to support the fast channel scan mode.

13. The Bluetooth device according to claim 8, wherein the wireless receiver is a narrow band communication system, and the analog IF signal is an ultra low range.

* * * * *